(12) United States Patent
Guivarc'h et al.

(10) Patent No.: US 10,934,851 B2
(45) Date of Patent: Mar. 2, 2021

(54) LEADING EDGE SHIELD

(71) Applicant: SAFRAN AIRCRAFT ENGINES, Paris (FR)

(72) Inventors: Jérémy Guivarc'h, Moissy-Cramayel (FR); Alain Jacques Michel Bassot, Moissy-Cramayel (FR); Gérald Diogo, Moissy-Cramayel (FR); Jean-Louis Romero, Moissy-Cramayel (FR); Thibault Ruf, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/064,473

(22) PCT Filed: Dec. 21, 2016

(86) PCT No.: PCT/FR2016/053603
§ 371 (c)(1),
(2) Date: Jun. 21, 2018

(87) PCT Pub. No.: WO2017/109404
PCT Pub. Date: Jun. 29, 2017

(65) Prior Publication Data
US 2019/0024512 A1 Jan. 24, 2019

(30) Foreign Application Priority Data
Dec. 21, 2015 (FR) ...................... 1563004

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F01D 5/288* (2013.01); *F05D 2220/36* (2013.01); *F05D 2240/303* (2013.01)

(58) Field of Classification Search
CPC .... F01D 5/288; F01D 5/147; F05D 2240/303; F05D 2220/36
(Continued)

(56) References Cited

U.S. PATENT DOCUMENTS

| 4,895,491 A * | 1/1990 | Cross .................... F04D 29/388 |
| | | 244/123.9 |
| 5,141,400 A | 8/1992 | Murphy et al. |
| 7,789,630 B2 * | 9/2010 | Schilling ............... B64C 11/205 |
| | | 416/224 |

(Continued)

FOREIGN PATENT DOCUMENTS

| JP | S5042105 U | 4/1975 |
| JP | 2005-256838 A | 9/2005 |

(Continued)

OTHER PUBLICATIONS

International Search Report dated Mar. 27, 2017, in International Application No. PCT/FR2016/053603 (2 pages).
(Continued)

*Primary Examiner* — Courtney D Heinle
*Assistant Examiner* — Andrew Thanh Bui
(74) *Attorney, Agent, or Firm* — Bookoff McAndrews, PLLC

(57) ABSTRACT

The invention relates to the field of turbomachine blades, and more specifically to a leading-edge shield (32) for a turbomachine blade (16), said leading-edge shield (32) having a pressure-side wing (34) and a suction-side wing (36), each extending along a height and along a length, the wings being connected together over their height, the pressure-side wing (34) presenting a greater length than the suction-side wing (36) over a first segment (S1) of the leading-edge shield (32), and an equal or smaller length than the suction-side wing (36) over a second segment (S2) of the leading-edge shield (32).

10 Claims, 2 Drawing Sheets

(58) Field of Classification Search
USPC .......................................................... 416/224
See application file for complete search history.

(56) References Cited

U.S. PATENT DOCUMENTS

| 9,995,152 | B2* | 6/2018 | McComb ................ F01D 5/147 |
| 10,539,025 | B2* | 1/2020 | Kray ...................... F01D 9/041 |
| 2009/0025365 | A1 | 1/2009 | Schilling et al. |
| 2013/0004322 | A1 | 1/2013 | Schwarz et al. |
| 2013/0236323 | A1 | 9/2013 | Mironets et al. |
| 2014/0093378 | A1* | 4/2014 | Clavette ............... B64C 11/205 416/224 |
| 2015/0104325 | A1* | 4/2015 | Yagi ...................... F01D 5/282 416/224 |
| 2015/0377030 | A1* | 12/2015 | Murdock ............... F01D 5/147 416/224 |
| 2016/0052621 | A1* | 2/2016 | Ireland .................. F04D 29/30 137/13 |

FOREIGN PATENT DOCUMENTS

| JP | 2009-024695 A | 2/2009 |
| JP | 2012-026448 A | 2/2012 |
| JP | 2013-544959 A | 12/2013 |
| JP | 2014-511280 A | 5/2014 |
| RU | 2498083 C2 | 11/2013 |
| WO | WO 2010/084941 A1 | 7/2010 |
| WO | WO 2014/149098 A2 | 9/2014 |
| WO | WO 2014/196987 A2 | 12/2014 |

OTHER PUBLICATIONS

Official Communication issued in corresponding Russian Application No. 2018126685 dated May 28, 2020 (12 pages).

Official Communication in Japanese Patent Application No. 2018-532743, dated Dec. 1, 2020 (8 pages), and English translation of Official Communication (9 pages).

* cited by examiner

LEADING EDGE SHIELD

CROSS-REFERENCE TO RELATED APPLICATIONS

This application is the U.S. national phase entry under 35 U.S.C. § 371 of International Application No. PCT/FR2016/053603, filed on Dec. 21, 2016, which claims priority to French Patent Application No. 1563004, filed on Dec. 21, 2015, the entireties of each of which are herein incorporated by reference.

BACKGROUND OF THE INVENTION

The present invention relates to a leading-edge shield for a turbomachine blade. The term "turbomachine" is used in this context to mean any machine in which energy can be transferred between a fluid flow and at least one set of blades, e.g. such as a compressor, a pump, a turbine, a propeller, or indeed a combination of at least two of the above.

Such leading-edge shields are typically for protecting the leading edges of rotating blades or of guide vanes against impacts. The term "blades" is used in this context both for fan blades and for the blades of an aircraft propeller. In order to limit their weight, such blades are typically mainly in the form of a blade body made of organic matrix composite material, e.g. a polymer, reinforced by fibers. Although such materials present mechanical qualities that are generally very favorable, in particular compared with their weight, they are nevertheless somewhat sensitive to point impacts. Shields, typically made of very strong metal material such as titanium alloys, are thus normally installed on the leading edges of such blades, in order to protect them against such impacts. Such shields are normally in the form of a thin pressure-side wing and a thin suction-side wing joined together by a thicker section overlying the leading edge, the wings and the thicker section fitting closely to the shape of the blade on the leading edge and on the adjacent pressure-side and suction-side sections. The pressure-side and suction-side wings extend along a height and along a length respectively over these pressure-side and suction-side sections of the blade, they serve mainly to ensure that the shield is positioned and fastened on the leading edge, and they also serve to distribute the force of an impact and to dissipate its energy over a larger area of the blade body. For this reason, the pressure-side wing typically presents a greater length than the suction-side wing over the entire height of the shield, since the pressure side of the blade is more exposed to impacts. Nevertheless, in particular on rotary blades, this additional length of the pressure-side wing leads to the drawback of significantly increasing the weight of the shield, and thus its inertia about an axis aligned with the height direction.

OBJECT AND SUMMARY OF THE INVENTION

The present disclosure seeks to remedy those drawbacks by proposing a leading-edge shield for a turbomachine blade that makes it possible to provide protection that is appropriate for the pressure side of the blade with weight and inertia that are reduced.

In at least one embodiment, this object is achieved by the fact that, in said leading-edge shield, which may be made of metal material and have a pressure-side wing and a suction-side wing, each extending along a height and along a length and being connected together over their height, the pressure-side wing presents a greater length than the suction-side wing over a first segment of the leading-edge shield, and an equal or smaller length than the suction-side wing over a second segment of the leading-edge shield.

By means of these provisions, it is possible to reduce the weight and the inertia of the shield when the blade body on the pressure side is less exposed to impacts and/or is less affected by impacts in said second segment of the shield than in said first segment.

Said first segment of the shield may extend over at least 60% of the height of the pressure-side and suction-side wings. In order to continue to provide sufficient protection for the pressure side in said second segment of the shield, the depth of the pressure-side wing may remain equal to or greater than 70% of the depth of the suction-side wing, or indeed 85%.

The present disclosure also provides a blade extending along a height from a blade root to a blade tip and comprising a blade body and such a leading-edge shield assembled to the blade body, the blade body being made of composite material having a polymer matrix reinforced by fibers, the leading-edge shield being made of a material that withstands point impacts better than the composite material of the blade body, and the first segment of the shield being closer to the blade root than is the second segment.

The present disclosure also provides a turbomachine having a plurality of such blades, a fan having a plurality of such blades, and a turbofan including such a fan.

BRIEF DESCRIPTION OF THE DRAWINGS

The invention can be well understood and its advantages appear better on reading the following detailed description of an embodiment shown as a nonlimiting example. The description refers to the accompanying drawings, in which.

DETAILED DESCRIPTION OF THE INVENTION

Figure 1:
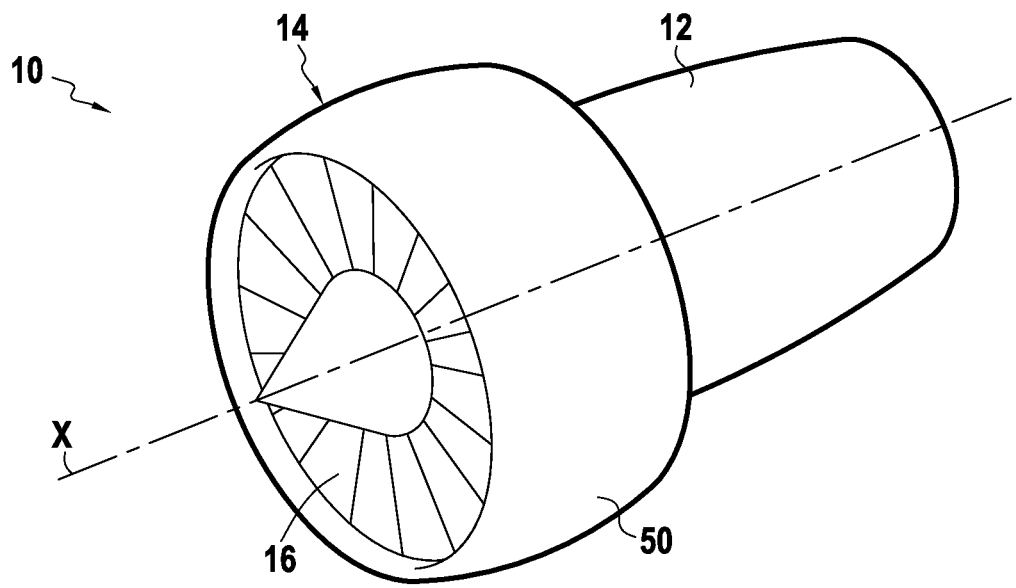
FIG. 1 is a diagrammatic perspective view of a turbofan.
Figure 2A:
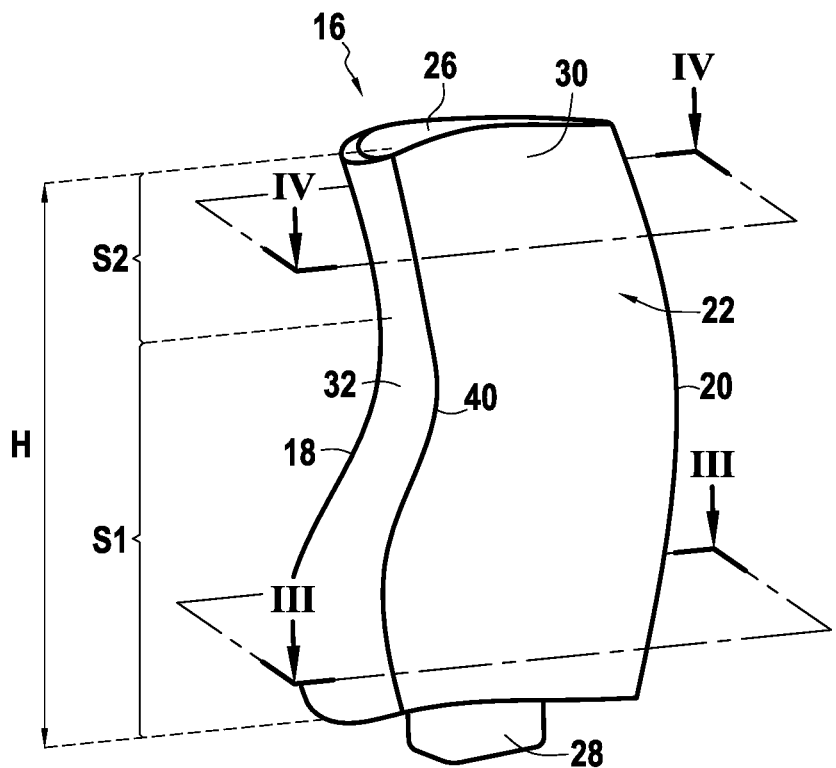
FIGS. 2A and 2B are diagrammatic perspective views respectively of the pressure side and of the suction side of a rotary blade of the FIG. 1 turbojet fan in one embodiment of the blade.
Figure 2B:
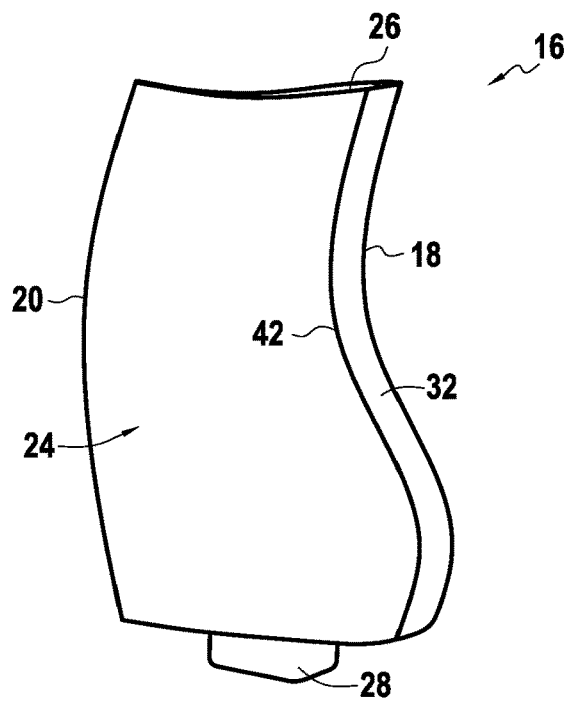

FIG. 1 shows a turbofan 10 having a gas generator unit 12 and a fan 14. The fan 14 has a plurality of rotary blades 16 arranged radially around a central axis X, the blades being aerodynamically profiled so as to impel air when they rotate and being surrounded by a fan casing 50. Thus, as shown in FIGS. 2A, 2B, 3, and 4, each blade 16 presents a leading edge 18, a trailing edge 20, a pressure side 22, a suction side 24, a blade tip 26, and a blade root 28.

In normal operation, the relative airflow is oriented substantially towards the leading edge 18 of each blade 16. Thus, the leading edge 18 is particularly exposed to impacts. In particular when the blade 16 comprises a blade body 30 made of composite material, in particular having a polymer matrix reinforced by fibers, it is appropriate to protect the leading edge 18 with a leading-edge shield 32 integrated in each blade. In other words, the leading-edge shield 32 is assembled on the blade body 30.

The leading-edge shield 32 is made of a material that is better at withstanding point impacts than is the composite material of the blade body 30. The leading-edge shield 32 is made mainly of metal, and more specifically out of a titanium-based alloy such as TA6V (Ti-6Al-4V), for example. The leading-edge shield 32 could equally well be made of steel or of the metal alloy commonly referred to by the registered trademark Inconel™. The term "Inconel" is used below to refer to an alloy based on iron alloyed with nickel and chromium.

The leading-edge shield 32 has a pressure-side wing 34, a suction-side wing 36, both of which extend along a height H of the shield 32, and a thicker central section 38 that is to overlie an edge of the blade body 30 and that joins together the pressure-side wing 34 and the suction-side wing 36 over the height H. The pressure-side and suction-side wings 34 and 36 serve to position the shield 32 on the blade body 30. Each of the pressure-side and suction-side wings 34 and 36 presents a free edge 40 or 42, and each extends along a length from the central section 38 to the corresponding free edge 40 or 42.

Figure 3:
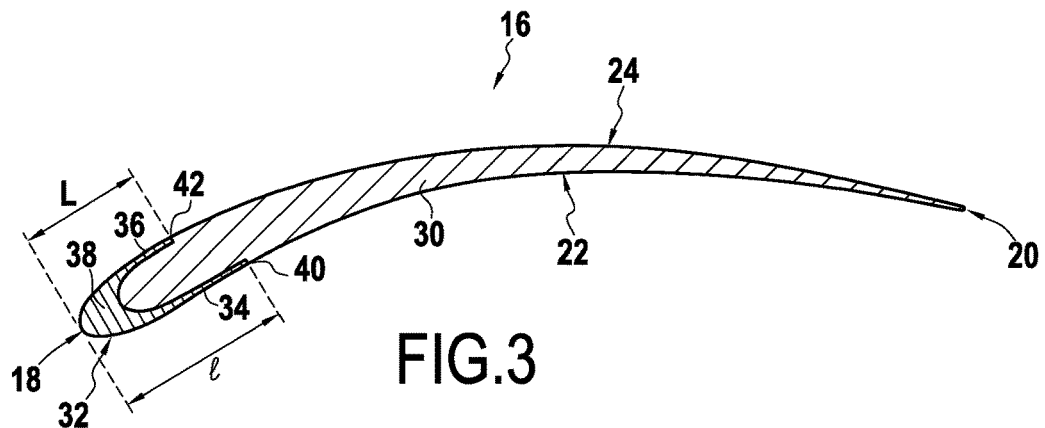
FIGS. 3 and 4 are fragmentary section views of the blade of FIGS. 2A and 2B, respectively on planes III-III and IV-IV.

The relative airflow normally presents a certain angle of attack relative to the leading edge 18, with the pressure side of the blade 16 being more exposed to impacts in the proximity of the leading edge 18 than is the suction side. For this reason, in the embodiment shown, in a first segment S1 of the leading-edge shield 32 adjacent to the blade root 28 and extending over at least 60% or indeed 75% of the height H of the leading-edge shield, the length l of the pressure-side wing 34 measured from the leading edge 18 to the free edge 40 is longer than the length L of the suction-side wing 36 measured from the leading edge 18 to the corresponding free edge 42, as shown in FIG. 3.

Figure 4:
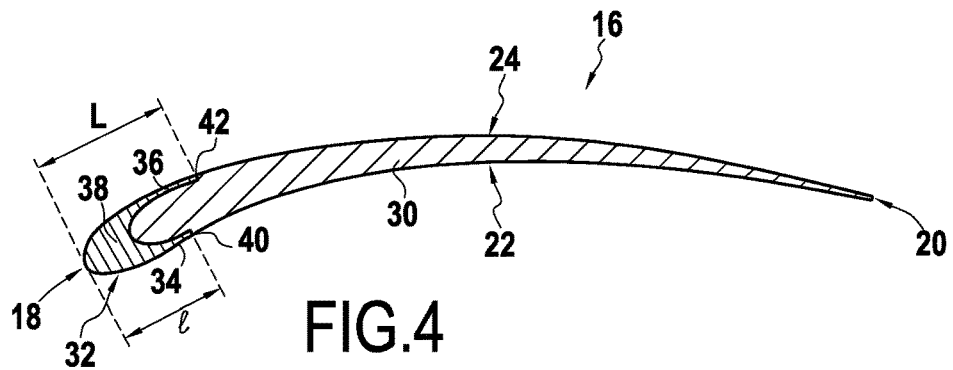

Nevertheless, because of the twisting of the blades and/or because of the casing 50, which presents an inlet that is smaller than the fan 14, is less exposed to high energy impacts. Thus, the length l of the pressure-side wing 34 can be reduced so as to become equal to or less than the length L of the suction-side wing 36 in a second segment S2 of the leading-edge shield 32 that is closer to the blade tip 26 than to the blade root 28, as shown in FIG. 4. Thus, the weight, and above all the inertia, of the shield 32 can be reduced without having any significant negative impact on the protection provided by the leading-edge shield 32. In this second segment S2 of the leading-edge shield 32, the length l of the pressure-side wing 34 may remain equal to or greater than 70%, or indeed 85% of the length L of the suction-side wing 36.

Although the present invention is described with reference to a specific embodiment, it is clear that various modifications and changes can be undertaken on those embodiments without going beyond the general ambit of the invention as defined by the claims. Also, individual characteristics of the various embodiments mentioned may be combined in additional embodiments. Consequently, the description and the drawings should be considered in a sense that is illustrative rather than restrictive.

The invention claimed is:

1. A leading-edge shield for a turbomachine blade, said leading-edge shield having a pressure-side wing and a suction-side wing, each extending along a height and along a length, the wings being connected together over their height, the pressure-side wing presenting a greater length than the suction-side wing over a first segment of the leading-edge shield, and an equal or smaller length than the suction-side wing over a second segment of the leading-edge shield, wherein the first segment of the shield extends over at least 60% of the height of the pressure-side and suction-side wings.

2. The leading-edge shield according to claim 1, wherein in said second segment of the shield, the length of the pressure-side wing remains equal to or greater than 70% of the length of the suction-side wing.

3. The leading-edge shield according to claim 2, wherein in said second segment of the shield, the length of the pressure-side wing remains equal to or greater than 85% of the length of the suction-side wing.

4. The shield according to claim 1, made of metal material.

5. A blade extending along a height from a blade root to a blade tip and comprising a blade body and the leading-edge shield according to claim 1 assembled on the blade body, the blade body being made of a composite material having a polymer matrix reinforced by fibers, and the leading-edge shield being made of a material with better point impact resistance than the composite material of the blade body.

6. The blade according to claim 5, wherein the first segment of the leading-edge shield is closer to the blade root than is the second segment of the leading-edge shield.

7. A turbomachine including a plurality of blades according to claim 5.

8. A fan including a plurality of blades according to claim 5.

9. A turbofan including an engine and the fan according to claim 8.

10. The turbofan according to claim 9, further comprising:
a fan casing surrounding the fan, and including an inlet smaller than the fan.

* * * * *